(12) United States Patent
Ali et al.

(10) Patent No.: US 12,146,088 B1
(45) Date of Patent: Nov. 19, 2024

(54) IMMOBILIZATION OF LANTHANIDE ALUMINATE NANOPARTICLES INTO ELECTROSPUN POLYLACTIC ACID NANOFIBERS FOR DUAL-MODE SECURITY AUTHENTICATION

(71) Applicant: KING FAISAL UNIVERSITY, Al-Ahsa (SA)

(72) Inventors: Mai Mostafa Khalaf Ali, Al-Ahsa (SA); Hany Mohamed Abd El-Lateef Ahmed, Al-Ahsa (SA); Mohamed Gouda, Al-Ahsa (SA); Fakiha El-Taib Heakal, Cairo (EG); Ibrahim Mohamed Abdelhalim Mohamed, Sohag (EG)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/438,748

(22) Filed: Feb. 12, 2024

(51) Int. Cl.
| | | |
|---|---|---|
| *C09K 11/07* | (2006.01) | |
| *B82Y 20/00* | (2011.01) | |
| *B82Y 40/00* | (2011.01) | |
| *C08G 63/08* | (2006.01) | |
| *C08K 3/22* | (2006.01) | |

(Continued)

(52) U.S. Cl.
CPC .......... *C09K 11/7792* (2013.01); *C08G 63/08* (2013.01); *C08K 3/22* (2013.01); *C09K 11/02* (2013.01); *D01D 5/0038* (2013.01); *D01F 1/10* (2013.01); *D01F 6/625* (2013.01); *D04H 1/435* (2013.01); *D04H 1/43838* (2020.05); *D04H 1/728* (2013.01); *B82Y 20/00* (2013.01); *B82Y 40/00* (2013.01); *C08K 2003/2227* (2013.01); *C08K 2201/011* (2013.01); *D10B 2331/041* (2013.01); *D10B 2401/20* (2013.01)

(58) Field of Classification Search
CPC .......... D10B 2401/20; D10B 2331/041; B05D 1/007; C08K 3/22; D01D 5/0038; B82Y 20/00; B82Y 40/00; A61N 5/062; A61N 2005/0662; A61N 2005/0663; C12N 2533/40; D04H 1/43838; D04H 1/435; D04H 1/728; D01F 1/10; C09K 11/02; C09K 11/7792; A61L 27/446; A61L 2300/624
USPC ........................................................ 428/372
See application file for complete search history.

(56) References Cited

U.S. PATENT DOCUMENTS

| | | |
|---|---|---|
| 2018/0050220 A1 | 2/2018 | Sepahvandi |
| 2022/0333005 A1 | 10/2022 | George et al. |

FOREIGN PATENT DOCUMENTS

| | | |
|---|---|---|
| CN | 110591315 A | 12/2019 |
| CN | 113563704 A | 10/2021 |

(Continued)

*Primary Examiner* — Camie S Thompson
(74) *Attorney, Agent, or Firm* — Nath, Goldberg & Meyer; Joshua B. Goldberg

(57) ABSTRACT

A photochromic material can include nanoparticles of rare-earth activated strontium aluminate (NRESA) embedded into polylactic acid (PLA). In some embodiments, the photochromic material may be transparent. In other embodiments, the photochromic material may be scratch resistant. In some embodiments, the photochromic material may be configured to form an anti-counterfeiting substance. The photochromic material may exhibit a green coloration after exposure to ultraviolet (UV) light. The NRESA may have a diameter of about 10 nm to about 15 nm. The electrospun photoluminescent nanofibrous film may have a fiber diameter of about 50 nm to about 200 nm.

8 Claims, 8 Drawing Sheets

(51) Int. Cl.
    *C09K 11/02*     (2006.01)
    *C09K 11/77*     (2006.01)
    *D01D 5/00*     (2006.01)
    *D01F 1/10*     (2006.01)
    *D01F 6/62*     (2006.01)
    *D04H 1/435*     (2012.01)
    *D04H 1/4382*     (2012.01)
    *D04H 1/728*     (2012.01)

(56) References Cited

FOREIGN PATENT DOCUMENTS

| | | |
|---|---|---|
| CN | 115612265 A | 1/2023 |
| CN | 115819939 A | 3/2023 |
| WO | 2023081631 A1 | 5/2023 |

IMMOBILIZATION OF LANTHANIDE ALUMINATE NANOPARTICLES INTO ELECTROSPUN POLYLACTIC ACID NANOFIBERS FOR DUAL-MODE SECURITY AUTHENTICATION

BACKGROUND

1. Field

The disclosure of the present patent application relates to a photochromic material and, particularly, to an electrospun photoluminescent nanofibrous film of polylactic acid embedded with strontium aluminate nanomaterials.

2. Description of the Related Art

Smart materials are employed in the creation of protection goods owing to their ability to respond to potentially harmful external stimuli such as extremely high temperatures and hazardous substances. Some smart materials either continue to emit light after switching off the illumination source, showing afterglow emission, or emit light beneath the excitation source to show fluorescence. Light-stimulated material may continue to emit light for a few seconds, showing phosphorescence, or for hours, showing afterglow emission.

Photochromism is the term for a light-stimulated change in color that takes place in a material when it is exposed to an illumination source and then regains its original color when the illumination source is moved away. Photochromism has been an efficient approach to enhance the authenticity of commercial products.

Most materials that have UV-induced photochromism are colored using organic colorants. However, the limitations of UV-induced chromic organic pigments include poor photostability, photochromism inhibition, and expensive cost, which restricts their applicability. The organic pigments photochromism relies on have structural switching. Thus, their photochromic activity is frequently inhibited by steric effects brought on by immobilization in bulk materials. Additionally, continued exposure to UV light may cause organic colorants to gradually photodegrade, resulting in poor photostability. However, no steric effects occur with photochromic inorganic colorants. As a result, photochromic inorganic colorants have enhanced photochromic properties and strong photostability.

Due to their excellent photostability, strontium aluminate phosphors (SAPs) have better resistance to fatigue. SAPs are recyclable, non-radioactive, and non-toxic. Among other luminous rare-earthdoped inorganic pigments they have great brightness, strong afterglow emission (>10 h), and excellent resistance to water, heat, light and chemicals. The ratio of SAPs in the material is necessary for determining the target application, including photochromism or afterglow. SAPs have therefore been preferred for use in a variety of smart products.

In order to develop an authentication nanofibrous film with mechanical reliability, it is crucial to improve the engineering production route of the authentication materials.

SUMMARY

To develop photochromic materials that can be used to enhance the authenticity of commercial products, i.e., an authentication nanofibrous film with mechanical reliability, an electrospun photoluminescent nanofibrous film is presented herein made from polylactic acid (PLA). Nanoparticles of rare-earth activated strontium aluminate (NRESA) are physically embedded into the polylactic acid films to produce a colorless nanocomposite film, i.e., a film that is colorless in daylight but can become an intense green in ultraviolet light.

The strontium aluminate photochromic agent can be applied in a nanoparticle form to ensure film transparency by enhancing its dispersion without aggregation in the electrospun polylactic acid nanofiber bulk. An emission peak was observed at 518 nm after excitation of the pigment-polylactic acid nanofibers at 365 nm. Raising the NRESA ratio can increase hydrophobic properties of the pigment-polylactic acid nanofibers without changing their visual or mechanical properties. The transparent films showed high photochromic reversibility without exhaustion under numerous exposure cycles of ultraviolet light and darkness. The nanofibrous mats were elastic and flexible. These transparent films can be used for making a variety of anti-counterfeiting substances.

Green coloration detected upon exposing the PLA film to ultraviolet (UV) light was verified by spectral analyses using photoluminescence and International Commission on Illumination (CIE) Lab parameters. The PLA films with low quantities of NRESA were found to quickly reverse this emission activity after removing the ultraviolet source, which suggest fluorescence emission.

The chemical structure of NRESA was verified by X-ray diffraction (XRD). Transmission electron microscope (TEM) and scanning electron microscope (SEM) were utilized to explore the morphological properties of NRESA. The present NRESA@PLA nanofibers were shown to exhibit a smooth surface with a nanofiber diameter of about 50 nm to about 200 nm. X-ray fluorescence (XRF), energy-dispersive X-ray spectroscopy (EDS, EDX, or XEDS), and SEM were employed to investigate the morphological features of the present PLA films.

As compared to a NRESA-free polylactic acid control sample, the NRESA@PLA films demonstrated improved scratch resistance. The hydrophobicity and UV resistance of the NRESA@PLA film improved with an increase in the concentration of NRESA.

Accordingly, in an embodiment, the present subject matter relates to a photochromic material that can include nanoparticles of rare-earth activated strontium aluminate (NRESA) embedded into polylactic acid (PLA). The PLA embedded with the NRESA can take the form of electrospun photoluminescent nanofibers. In some embodiments, the material may be transparent, or may be colorless in daylight. In other embodiments, the material may be scratch resistant.

The photochromic material may exhibit a green coloration after exposure to ultraviolet (UV) light. The NRESA may include a diameter of about 10 nm to about 15 nm.

These and other features of the present subject matter will become readily apparent upon further review of the following specification.

DETAILED DESCRIPTION OF THE PREFERRED EMBODIMENTS

Figure 1:
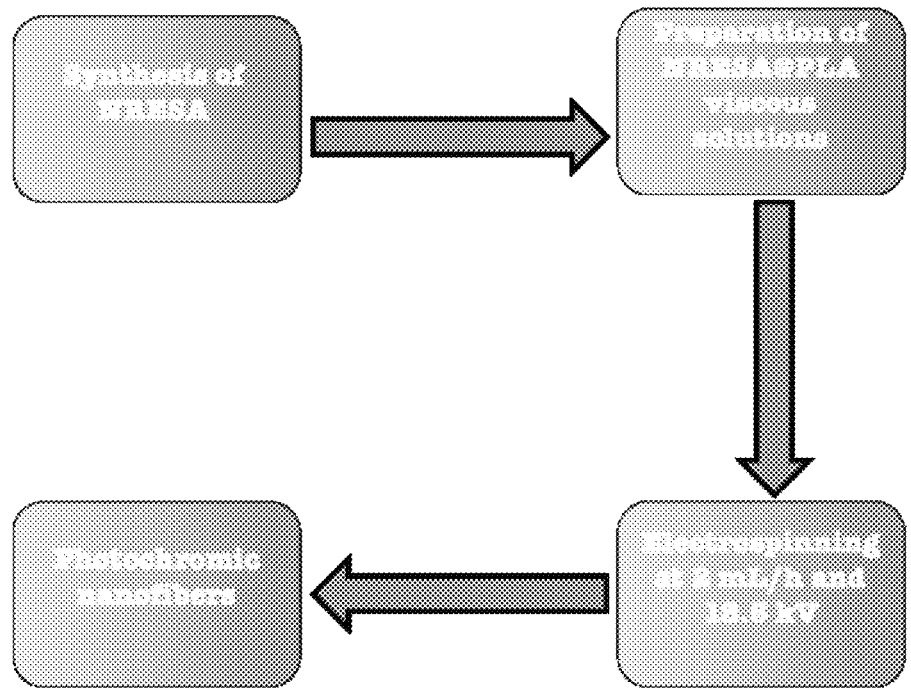
FIG. 1 is a scheme illustrating the production steps of the NRESA@PLA nanofibers described herein.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

A photochromic material as described herein can include nanoparticles of rare-earth activated strontium aluminate (NRESA) embedded into polylactic acid (PLA). In some embodiments, the photochromic material may be transparent. In other embodiments, the photochromic material may be scratch resistant. In additional embodiments, the photochromic material can be used to enhance the authenticity of commercial products, i.e., an authentication nanofibrous film with mechanical reliability. The photochromic material may exhibit a green coloration after exposure to ultraviolet (UV) light. The NRESA may have a diameter of about 10 nm to about 15 nm. The electrospun photoluminescent nanofibrous film may have a diameter of about 50 nm to about 200 nm.

In another embodiment, the present subject matter relates to a method of forming a photochromic material as described herein, and as seen in FIG. 1, that can begin with dissolving polylactic acid (PLA), for example, a 15% w/v polylactic acid, in acetone, for example, 10% w/v of the PLA in acetone, then adding various concentrations of NRESA thereto to obtain a NRESA@PLA viscous solution.

The NRESA@PLA viscous solution can be stirred, for example, for about 2 hours, at least about 2 hours, or about 1.5 to about 2.5 hours, followed by homogenization, for example, for at least about 30 minutes, about 30 minutes, or about 25 to about 35 minutes at about 35 kHz. To accomplish homogeneity. Nanofibrous films thereof can then be prepared by charging the corresponding viscous solutions into an electrospinning device. The electrospinning tool used in this regard has three essential components, including a syringe pump, a power source, i.e., a high voltage power supply, and a collector for dispensing nanofibers. In an embodiment, the NRESA@PLA viscous solution can be inserted into a plastic syringe with a needle tip. The NRESA@PLA viscous solution is exposed to injection at a flow rate of about 2 mL/hr. The PLA nanofibers are obtained at a rotation rate of 150 rpm. The needle tip of the syringe is placed at about 15 cm to about 20 cm, or about 18 cm, from the collector while applying about 18.5 kV thereto. The electrospinning can be conducted under ambient conditions, i.e., at about 25° C.

Different amounts of NRESA, including 0% ($PLA_0$), 0.1% ($PLA_1$), 0.3% ($PLA_2$), 0.5% ($PLA_3$), 0.7% ($PLA_4$), 0.9% ($PLA_5$), 1.1% ($PLA_6$), and 1.3% ($PLA_7$) w/w, are used in the creation of the NRESA@PLA nanofibers. Accordingly, about 0% to about 1.5% by weight of NRESA can be used herein.

The following examples illustrate the present teachings.

Example 1

Preparation of NRESA $SrCO_3$ (1.0 mol), $Al_2O_3$ (2.0 mol), $H_3BO_3$ (0.2 mol), $Dy_2O_3$ (0.03 mol), and $Eu_2O_3$ (0.02 mol) powders were mixed in ethanol (150 mL). Micro-scaled NRESA particles were obtained, after 1 hour of ultrasonic (35 kHz) treatment, 3 hours of drying at 90° C., 2 hours of grinding, and 3 hours of sintering (1300° C.) in a carbon-based reductive environment. Microparticles of RESA were produced by milling and sieving the obtained powder. Employing the top-down method, 10 g of RESA micropowder were inserted in a ball mill vial (20 cm; stainless steel) mounted on a vibrating disc (20 cm). After 22 hours of being grinded into a nanopowder by continuous collisions of a ball mill (0.1 cm; silicon carbide) with the ball mill vial and the vibrating disc, NRESA were produced.

Figure 2A:
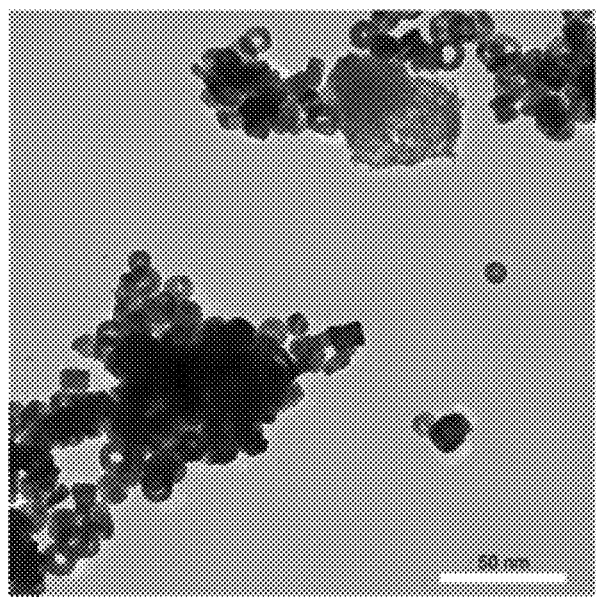
FIGS. 2A, 2B, and 2C shows transmission electron microscope (TEM) photos of embodiments of nanoparticles of rare-earth activated strontium aluminate (NRESA) as described herein.
Figure 2B:
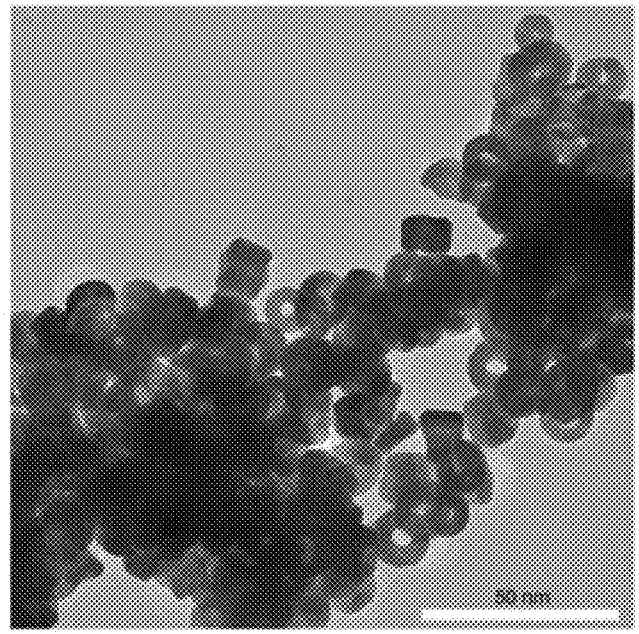
Figure 2C:
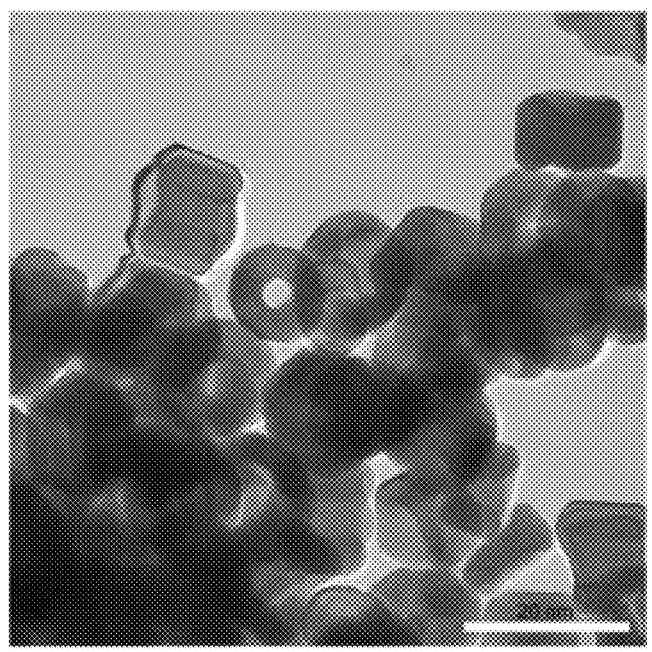

A micropowder of rare-earth strontium aluminate was prepared using this high temperature solid state method. Then, the top-down technique was applied to produce nanoparticles of rare-earth strontium aluminate (NRESA). The particle size of NRESA, as determined by TEM, is monitored between 10 and 15 nm as illustrated in FIGS. 2A, 2B, and 2C.

Example 2

Preparation of NRESA@PLA Nanofibers

Polylactic acid is an amorphous polymer with an 88 wt % of L-lactide content, and a molecular weight of $1.20 \times 10^5$ g/mol as determined by gel permeation chromatography. Thus, a concentration of 15% (w/v) of polylactic acid was chosen. The NRESA@PLA nanofibers were prepared as shown in FIG. 1. Acetone was used to dissolve 10% (w/v) of PLA, and then various concentrations of NRESA were added, including 0 ($PLA_0$), 0.1% ($PLA_1$), 0.3% ($PLA_2$), 0.5% ($PLA_3$), 0.7% ($PLA_4$), 0.9 ($PLA_5$), 1.1% ($PLA_6$), and 1.3% ($PLA_7$). Two hours of stirring was followed by thirty minutes of homogenization at 35 kHz. The nanofibrous films were generated by charging the corresponding viscous solutions described above into an electrospinning device. The thick NRESA@PLA liquid was first charged into a plastic syringe (5 mL) in order to inject fibers at a constant flow rate of 2 mL/h. A wire of copper was used to join a metal plate covered with aluminum foil, creating a positive electrode. The aluminum planar collector and tip were kept 15 cm apart while applying 18.5 kV. The electrospinning process was performed under ambient conditions (25° C.).

The electrospinning equipment consists of a collector for dispensing nanofibers, power source, and syringe pump. Fibers were collected at a rotational speed of 185 rpm. A direct current power supply and a plastic syringe with a needle (stainless steel) were connected to a programmed pump. The viscous solutions of NRESA@PLA were subjected to an electrical potential of 18.5 kV. After that, a thin nanofibrous layer was expelled by the syringe needle (0.6 mm) onto an Al-collector (15×15 cm). The syringe needle was placed at about 18 centimeters from collector.

Figure 3:
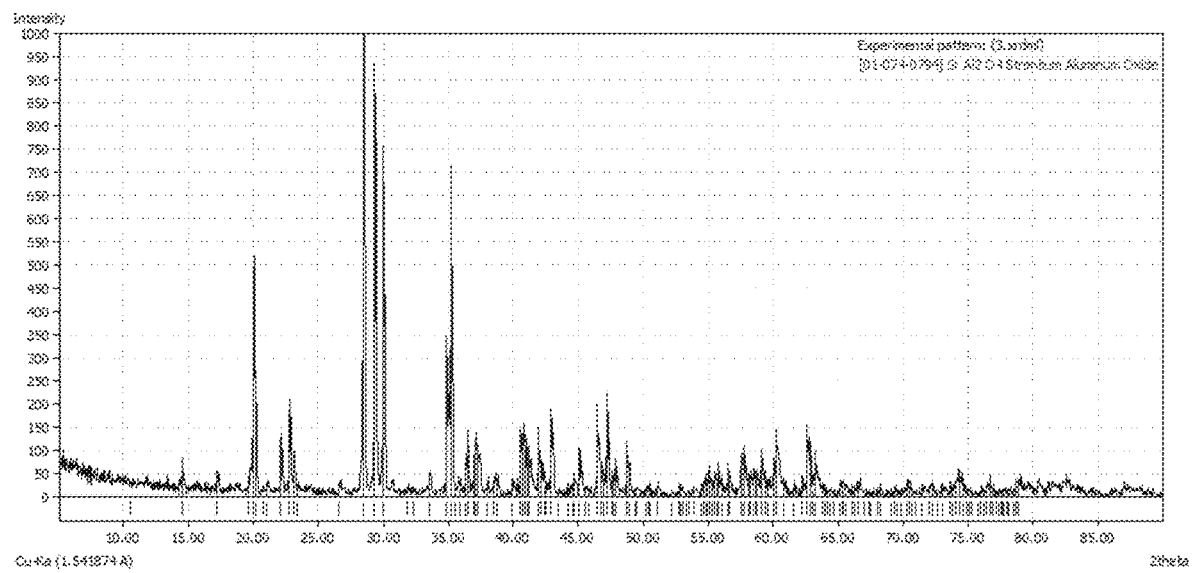
FIG. 3 shows an x-ray diffraction (XRD) spectral analysis of NRESA (top) and the corresponding standard spectrum (bottom).
Figure 4A:
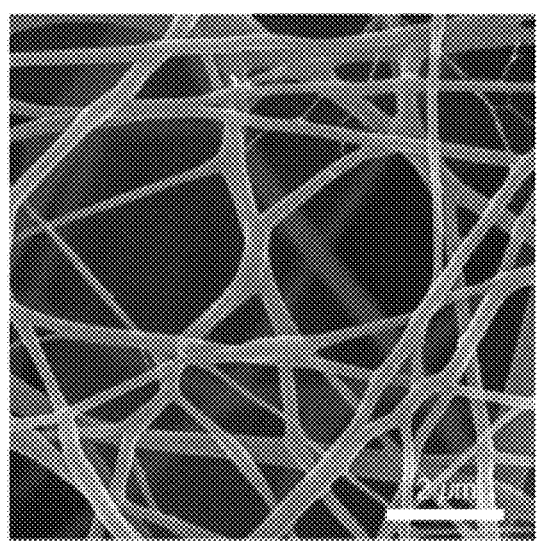
FIGS. 4A, 4B, and 4C show SEM analysis of NRESA-free PLA; $PLA_0$.
Figure 4B:
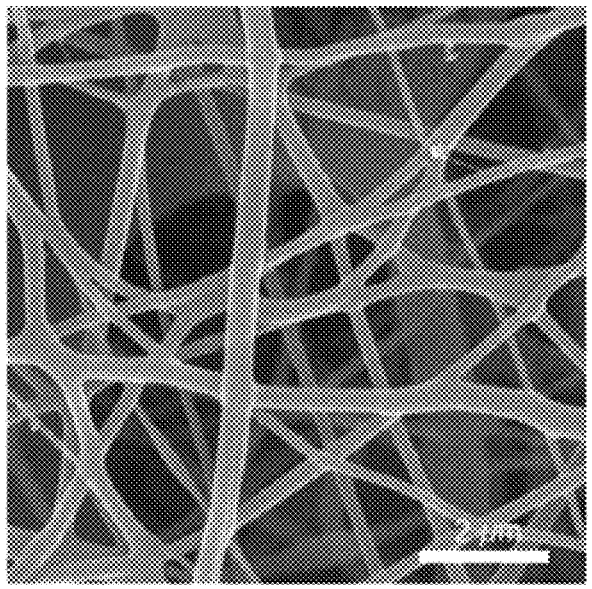
Figure 4C:
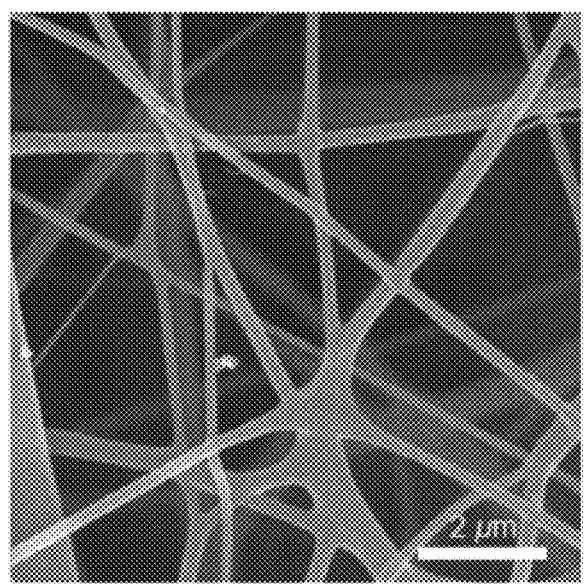
Figure 5A:
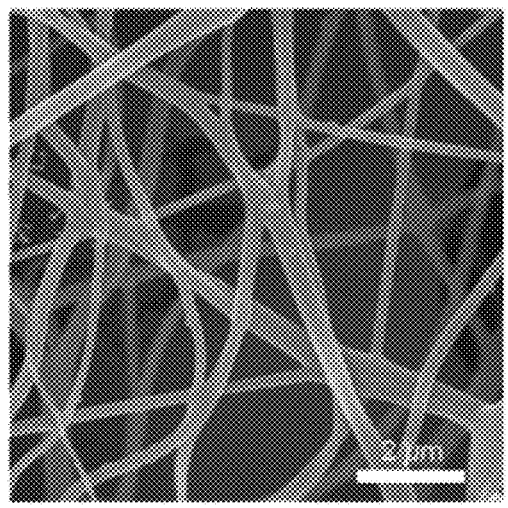
FIGS. 5A, 5B, and 5C show SEM analysis of an embodiment of a photoluminescent NRESA@PLA; $PLA_5$.
Figure 5B:
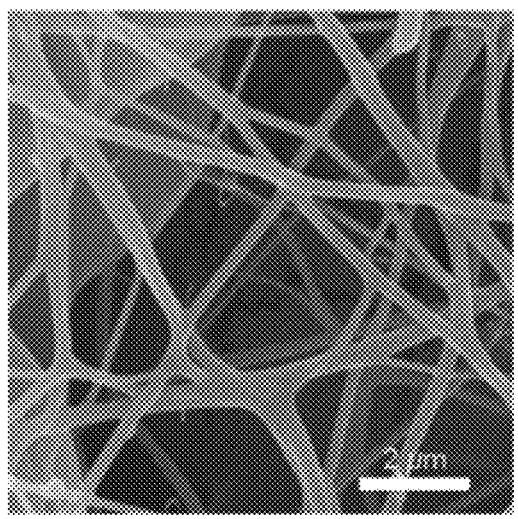
Figure 5C:
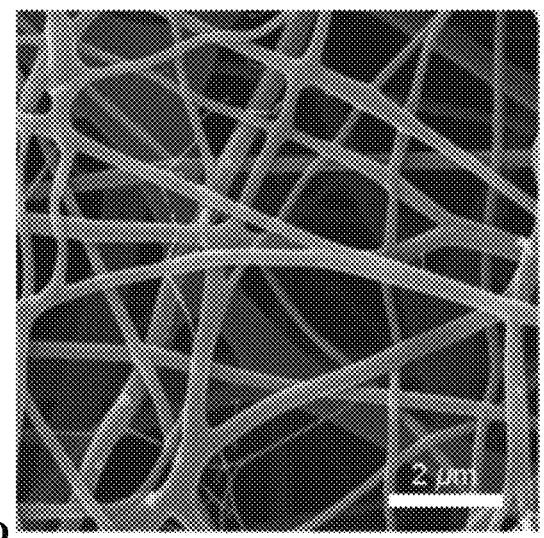

XRD analysis of NRESA and the corresponding standard spectrum are shown in FIG. 3. The diffraction signals of NRESA matched the pure monoclinic phase of $SrAl_2O_4$ (JCPDS card No. 01-074-0794). No crystalline phase was monitored in the XRD spectrum to indicate the presence of dopant ions ($Eu^{2+}$ and $Dy^{3+}$) in the crystal lattice of $SrAl_2O_4$. No diffraction peaks were detected for starting compounds to verify that the nanoparticle phase content is monoclinic low temperature phase, proving that the extremely low contents of dopant ions ($Eu^{2+}$ and $Dy^{3+}$) had nearly no effect on the phase composition of strontium aluminum oxide.

Example 3

Luminescence Spectra

The transparent backgrounds of the NRESA@PLA films facilitated the identification of the UV-induced colorimetric change to green emission. The NRESA@PLA nanofibers displayed an instant and reversible photochromic nature after being subjected to ultraviolet light. Nonetheless, fluorescence emission was detected in the NRESA@PLA samples with a NRESA ratio equal to or less than 0.9% as they quickly reversed once the ultraviolet lamp was turned off. The NRESA@PLA nanofibers with a higher ratio of NRESA to polylactic acid (>0.9%) demonstrated a slower reversibility when the ultraviolet lamp was switched off, designating the presence of afterglow. The excitation spectra of NRESA@PLA for different ratios of NRESA are illustrated in FIG. 6.

Figure 7:
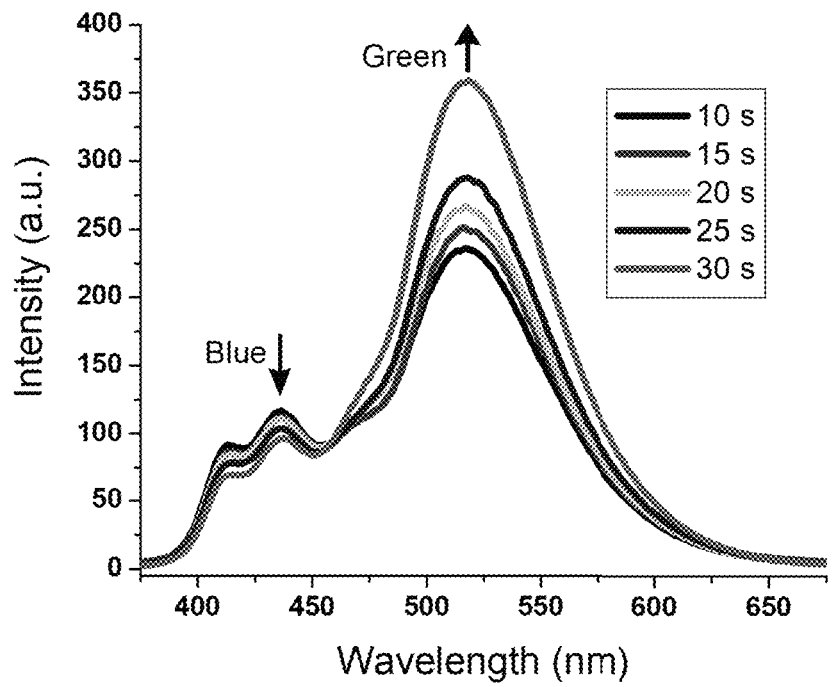
FIG. 7 shows a graph of the photoluminescence emission spectra of $PLA_5$ as a function of the ultraviolet illumination duration, i.e., 10-30 s.

The intensity strength of the excitation band was found to increase with raising the quantity of NRESA. Thus, the higher concentration of NRESA results in a stronger excitation intensity. The emission band measurements of NRESA@PLA nanofibers as a function of ultraviolet-irradiation duration from 10 to 30 s are depicted in FIG. 7. The intensity strength of the emission peak (518 nm) rose when the duration of UV irradiation was prolonged. PLA was used as a trapping matrix to hold NRESA. It can be concluded that the aluminum element of NRESA forms a coordinative connection with the carbonyl ester of polylactic acid. This suggests that NRESA strengthens the connections between the individual polymer chains.

Figure 6:
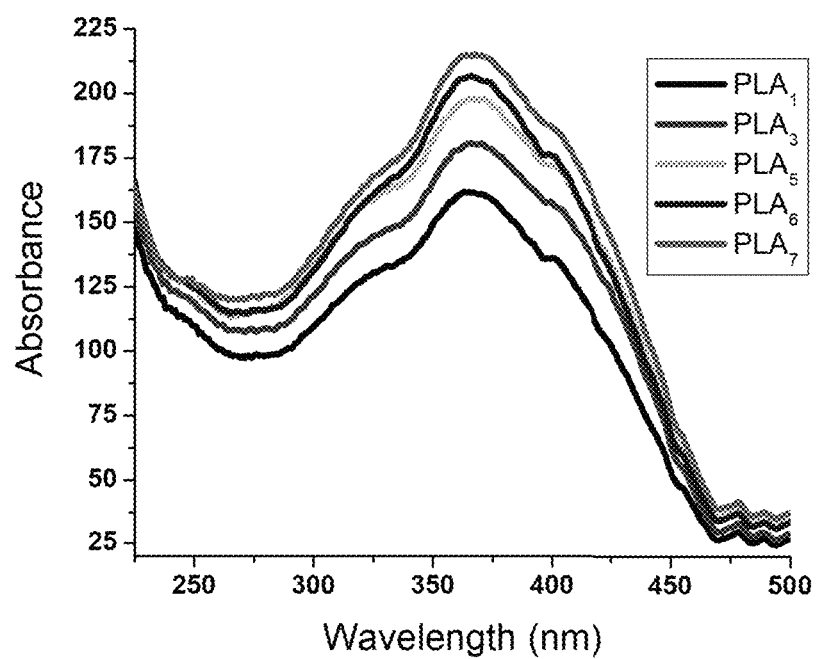
FIG. 6 shows a graph of the excitation analysis of embodiments of NRESA@PLA at various NRESA ratios by weight percent.

The luminescence spectra of $PLA_5$ as a function of the UV-illumination duration are shown in FIG. 6. The luminescence spectra demonstrate two distinctive emission bands, including bright green emission peak at 518 nm and another faintly blue peak at 435 nm. The emission spectra are caused by the 4f-5d transition of Eu(II). The $SrAl_2O_4$ crystal has two locations from where these emissions emerge. The blue fluorescence (435 nm) is normally relatively weak since it is suppressed by thermal quenching at room temperature. This implies that only the green emission, which is more prevalent, can be detected with the naked-eye. The Eu(III)-triggered emission was undetectable in the photoluminescence spectra. This means that the light emission can be ascribed only to Eu(II). The decay time of the NRESA@PLA fibers were also explored. The decay durations followed a second-order exponential decline, with a rapid initial decay followed by a slower second stage. The rapid decay monitored for $PLA_5$ indicates fluorescence phenomenon, and the slower decay observed for $PLA_6$ is indicative of phosphorescence emission.

Example 4

Reversibility and Photostability

Figure 8:
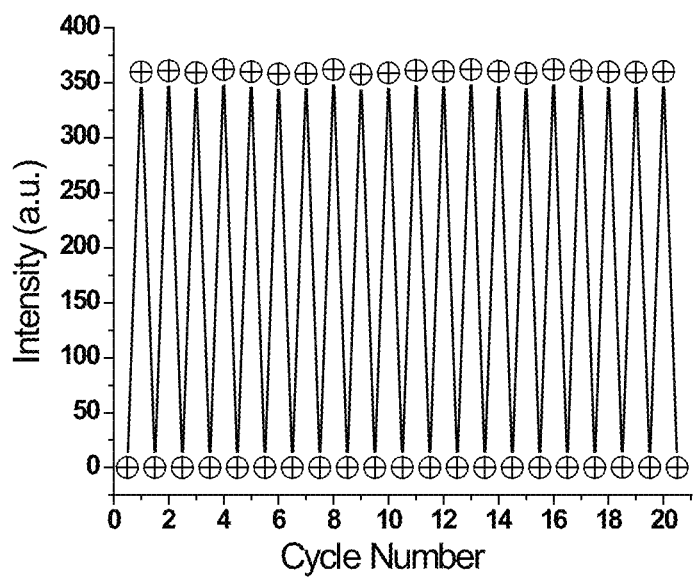
FIG. 8 shows that $PLA_5$ demonstrates reversible coloration-decoloration practice without fatigue under UV and visible lights.

The NRESA emission is a result of the $4f^65d^1 \leftrightarrow 4f^7$ transition of Eu(II). Since no emissions were detected for Eu(III) or Dy(III), it was determined that Eu(III) had been exchanged to Eu(II). Dy(III) develops traps that release light when the light source is off to enable Eu(II) to return to its ground status. Fatigue resistance is crucial because anti-counterfeiting materials need to be long-lasting and photostable. As shown in FIG. 8, the film ($PLA_5$) capacity to reversibly perform a coloration-decoloration practice under UV and visible lights, respectively, demonstrates its robust reversibility without fatigue.

Example 5

Coloration Properties

The results of the photochromic study are summarized in Table 1. All NRESA-impregnated luminescent polylactic acid films were visually transparent. Making a transparent NRESA@PLA film relies on the uniform integration of RESA nanoparticles into PLA by physical dispersion. Nanoparticles have shown amazing capability to sustain a material transparency. The findings of CIE Lab displayed that nanofibrous films with higher contents of NRESA appear greener in the presence of ultraviolet light as compared to films with lower contents of NRESA. Additionally, a greenish emission under ultraviolet lamp and a greenish-yellow afterglow emission even after the light was turned off were observed.

In visible light, the color strength exhibited a slight change from $PLA_0$ to $PLA_5$, verifying transparency. As the NRESA content further increased, transformation from colorless to slightly off-white was monitored for $PLA_6$ and $PLA_7$. The color strength rose considerably from $PLA_0$ to $PLA_5$ when exposed to UV light, showing that the green color generated by NRESA became more intense as phosphor concentration increased.

The UV-irradiated films were observed to exhibit higher color strength than the un-irradiated counterparts. This is attributed to the produced green emission under UV light, whereas a colorless look was monitored under visible light. NRESA@PLA was transparent in daylight (365 nm) and emitted green at 518 nm when exposed to UV.

In contrast to the luminous NRESA-containing polylactic acid nanofibers, the NRESA-free polylactic acid nanofibers showed very small changes in CIE Lab magnitudes (a*, b* and L*) under visible and UV lights. Since a slight decrease in L* indicates less transparency to the naked-eye, the polylactic acid films showed a little off-white color when the NRESA ratio was raised. The green glow underneath the ultraviolet source was shown to improve with increasing NRESA, showing a considerable decrease in L*. The readings of −a* and +b* were low in visible light, verifying transparency, and demonstrated basically slight changes with raising NRESA. The magnitudes of −a* and +b* were measured under a UV device, and it was found that as NRESA increased, the colors shifted toward a greener hue, with −a* values increasing and +b* values decreasing. Switching off the ultraviolet device allowed nanofibers with lower NRESA ratios ($PLA_1$ to $PLA_5$) to immediately revert to their transparent appearance, verifying fluorescence phenomenon.

In the polylactic acid nanofibers with higher NRESA ratios ($PLA_6$ to $PLA_7$), afterglow emission was detected with a considerable increase in −a* and decrease in +b*. According to the above results, $PLA_5$ was approved as the optimum photochromic film.

TABLE 1

Colorimetric features of NRESA@PLA under daylight (Dl) and UV light.

| Films | Color strength | | L* | | a* | | b* | |
|---|---|---|---|---|---|---|---|---|
| | Dl | UV | Dl | UV | Dl | UV | Dl | UV |
| $PLA_0$ | 0.39 | 0.45 | 94.06 | 93.62 | −0.07 | −0.09 | 1.43 | 1.31 |
| $PLA_1$ | 0.42 | 1.34 | 92.53 | 85.12 | −1.44 | −5.32 | 1.94 | 10.34 |
| $PLA_2$ | 0.50 | 1.48 | 91.17 | 83.96 | −1.37 | −6.07 | 1.71 | 9.62 |
| $PLA_3$ | 0.59 | 1.62 | 89.55 | 80.50 | −1.21 | −8.24 | 1.63 | 7.28 |
| $PLA_4$ | 0.64 | 1.72 | 88.85 | 79.18 | −1.12 | −11.89 | 1.53 | 6.37 |
| $PLA_5$ | 0.93 | 2.13 | 86.95 | 77.59 | −1.03 | −12.75 | 1.38 | 4.92 |
| $PLA_6$ | 1.29 | 2.60 | 84.82 | 76.99 | −0.88 | −13.20 | 1.22 | 3.94 |
| $PLA_7$ | 1.57 | 3.05 | 84.20 | 75.43 | −0.75 | −13.58 | 1.07 | 3.38 |

Example 6

Photochromic Properties

The anti-counterfeiting community has made extensive use of photochromism. Electrospinning a composite of NRESA and polylactic acid produced a transparent nanofibrous film. Photographs of $PLA_5$ subjected to visible and ultraviolet illuminations reveal its photochromism. No traces were detected in daylight; however, a strong green glow was monitored in UV light. The cosmetic industry depends on conventional anti-counterfeiting methods, such as the use of secure patterns to prevent forgeries. Those commonplace techniques of identification might very well have authenticity issues. Because of this, the processed $PLA_5$ film was used to make a photochromic pattern that is invisible in daylight. A photochromic pattern was produced by depositing nanofibers onto paper sheet. The attached pattern turns green upon exposure to ultraviolet light, demonstrating photochromism and serving as an exclusive pattern that cannot be duplicated.

Example 7

Morphological Properties

The shape of NRESA@PLA nanofibrous films are shown in FIGS. 4A-4C and 5A-5C. There were no noticeable differences detected in the NRESA@PLA nanofibrous films upon increasing the NRESA concentration from $PLA_0$ to $PLA_7$. The manufactured NRESA@PLA nanofibers exhibited a smooth surface with a nanofiber diameter of 50-200 nm. Since no RESA nanoparticles were observed on the surface of nanofibers, they appear well dispersed throughout the nanofiber bulk. EDS confirmed the presence of NRESA in the polylactic acid nanofibers. The elemental analysis was determined by EDS, demonstrating a homogeneous distribution of NRESA at three spots on the sample surface. Carbon, strontium, dysprosium, aluminum, oxygen, and europium are the tracked elements. The elemental compositions of polylactic acid are carbon and oxygen represented as a major component because PLA exits as a host bulk material, whereas the NRESA-based minor components include aluminum, europium, dysprosium, and strontium because NRESA exits as a guest trace material. All three examined sites showed consistent monitoring of elemental ratios, indicating uniform dispersion of RESA nanoparticles as shown in Table 2.

TABLE 2

EDS-based elemental analysis (wt %) of NRESA@PLA at three spots ($Sp_1$, $Sp_2$ and $Sp_3$) on the sample surface.

| Films | | C | O | Al | Sr | Eu | Dy |
|---|---|---|---|---|---|---|---|
| $PLA_0$ | $Sp_1$ | 66.85 | 33.15 | 0 | 0 | 0 | 0 |
| | $Sp_2$ | 67.94 | 32.06 | 0 | 0 | 0 | 0 |
| | $Sp_3$ | 67.79 | 32.21 | 0 | 0 | 0 | 0 |
| $PLA_1$ | $Sp_1$ | 67.30 | 31.54 | 0.65 | 0.37 | 0.12 | 0.02 |
| | $Sp_2$ | 67.08 | 31.70 | 0.68 | 0.42 | 0.10 | 0.03 |
| | $Sp_3$ | 66.94 | 31.92 | 0.56 | 0.36 | 0.14 | 0.07 |
| $PLA_5$ | $Sp_1$ | 65.81 | 32.50 | 0.78 | 0.58 | 0.23 | 0.10 |
| | $Sp_2$ | 65.38 | 32.77 | 0.87 | 0.59 | 0.22 | 0.18 |
| | $Sp_3$ | 65.59 | 32.84 | 0.85 | 0.63 | 0.28 | 0.12 |
| $PLA_7$ | $Sp_1$ | 65.56 | 32.52 | 0.96 | 0.74 | 0.28 | 0.14 |
| | $Sp_2$ | 65.06 | 32.83 | 0.83 | 0.77 | 0.30 | 0.22 |
| | $Sp_3$ | 65.10 | 32.82 | 0.85 | 0.73 | 0.36 | 0.15 |

The results of an X-ray fluorescence study were utilized to report the elemental compositions of NRESA@PLA as shown in Table 3. EDS has been described as a reliable technique for determining the elemental compositions of a substance. When the elemental concentration of a substance is more than 10 ppm, XRF has been utilized to assess its composition. Thus, a subset of the current components can be identified by XRF analysis. Only Sr and Al in $PLA_5$ were detected using XRF, whereas Eu and Dy were undetectable owing to their extremely minute concentrations. The elemental analyses examined by XRF and EDS demonstrated that the elemental contents utilized to make luminous fibers and NRESA were consistent.

Figure 9:
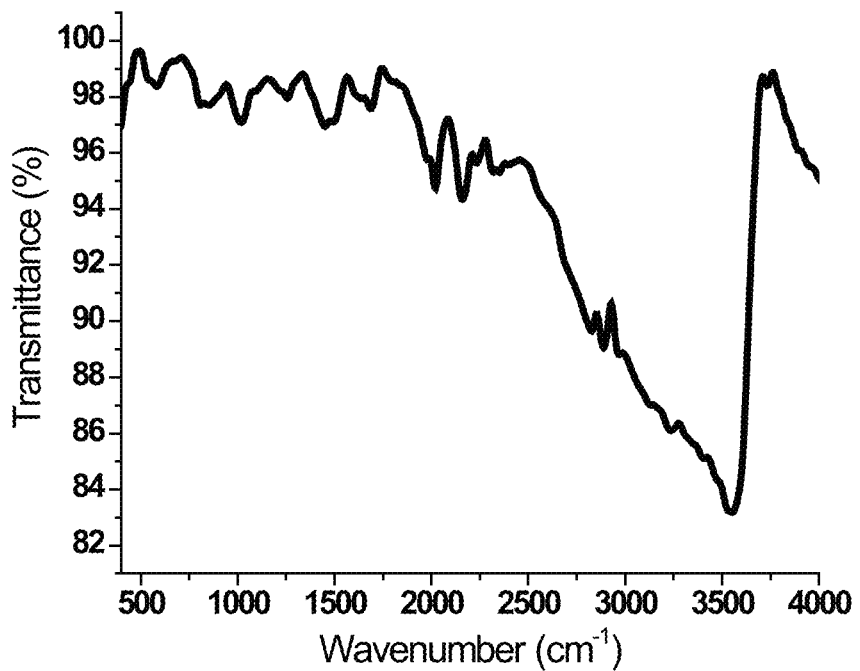
FIG. 9 shows an FTIR analysis of NRESA@PLA nanofibers; $PLA_5$.

The stretching vibration of the carbonyl ester functional groups was observed as a distinctive absorbance band at 1691 $cm^{-1}$ in FT-IR spectra of NRESA@PLA (FIG. 9). Vibrations associated with the aliphatic C—H stretching and binding vibrations were picked up at 2885 $cm^{-1}$ and 1251 $cm^{-1}$, respectively. It was discovered that immobilizing NRESA in polylactic acid nanofibers significantly reduced the intensity of the carbonyl ester absorption band. This could be attributed to the carbonyl group of polylactic acid forms a coordinative connection with aluminum of NRESA. Polylactic acid was employed as a hosting bulk to NRESA. The lattice vibration bands were determined at 809 $cm^{-1}$, 585 $cm^{-1}$, and 522 $cm^{-1}$ owing to O—Al, O—Sr, and O—Al—O, respectively.

TABLE 3

XRF analysis of elements in $PLA_5$.

| Elements | Contents (wt %) |
|---|---|
| Sr | 40.82 |
| Al | 58.16 |
| Ca | 1.02 |

Example 8

Hydrophobicity Study

Figure 10:
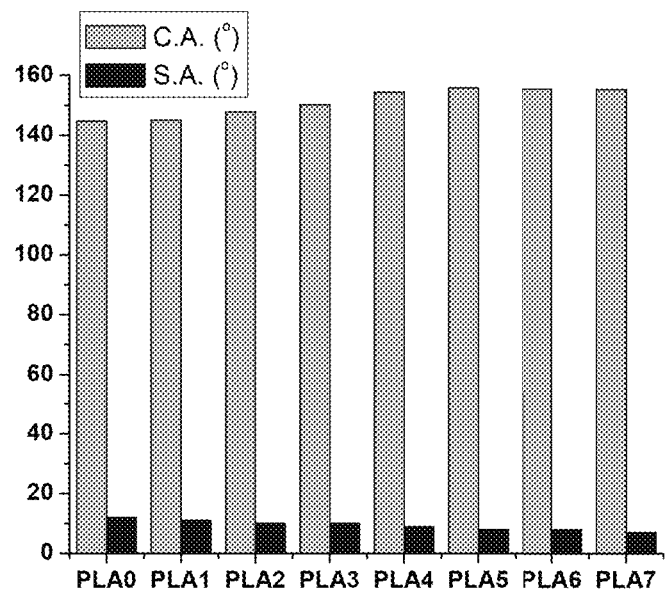
FIG. 10 shows a graph of hydrophobicity of NRESA@PLA nanofibers, demonstrating contacting (C.A.) and sliding (S.A.) angles.

The contacting angle (C.A.) of $PLA_0$ was measured to be 144.7°. C.A. was then improved to 145.0° ($PLA_1$) when NRESA was embedded into polylactic acid. C.A. was found to further increase from 145.0° ($PLA_1$) to 155.8° ($PLA_5$) when the NRESA concentration was further increased in the polylactic acid fibrous matrix. However, the samples with the greatest NRESA ratios, including $PLA_6$ (155.4°) and $PLA_7$ (0.1551°), displayed a lower roughness as a result of decreasing the gaps between the RESA nanoparticles, resulting in only modest improvements in the contact angle. FIG. 10 shows that when the NRESA content increased, the sliding angles were also decreased from 12° ($PLA_0$) to 7° ($PLA_7$).

It is to be understood that the photochromic materials described herein are not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A photochromic material, comprising:
   nanoparticles of rare-earth activated strontium aluminate (NRESA) embedded into polylactic acid (PLA),
   wherein the photochromic material is configured to form an anti-counterfeiting substance; and
   wherein the photochromic material is a photoluminescent nanofibrous film having a fiber diameter of about 50 nm to about 200 nm.

2. The photochromic material of claim 1, wherein the photochromic material is transparent.

3. The photochromic material of claim 1, wherein the photochromic material is scratch resistant.

4. The photochromic material of claim 1, wherein the photochromic material exhibits a green coloration after exposure to ultraviolet (UV) light.

5. The photochromic material of claim 1, wherein the NRESA have a diameter of about 10 nm to about 15 nm.

6. A photochromic material, comprising:
   an electrospun photoluminescent nanofibrous film of polylactic acid (PLA) including nanoparticles of lanthanide activated strontium aluminate (NRESA) embedded therein,
   wherein the photochromic material is transparent;
   wherein the photochromic material is configured to form an anti-counterfeiting substance; and
   wherein the photochromic material is a photoluminescent nanofibrous film having a fiber diameter of about 50 nm to about 200 nm.

7. The photochromic material of claim 6, wherein the photochromic material exhibits a green coloration after exposure to ultraviolet (UV) light.

8. The photochromic material of claim 6, wherein the NRESA have a diameter of about 10 nm to about 15 nm.

* * * * *